Oct. 11, 1966          E. R. HOOLEY                3,277,514
                    POULTRY NECK REMOVER
Filed Aug. 10, 1964                          2 Sheets-Sheet 1
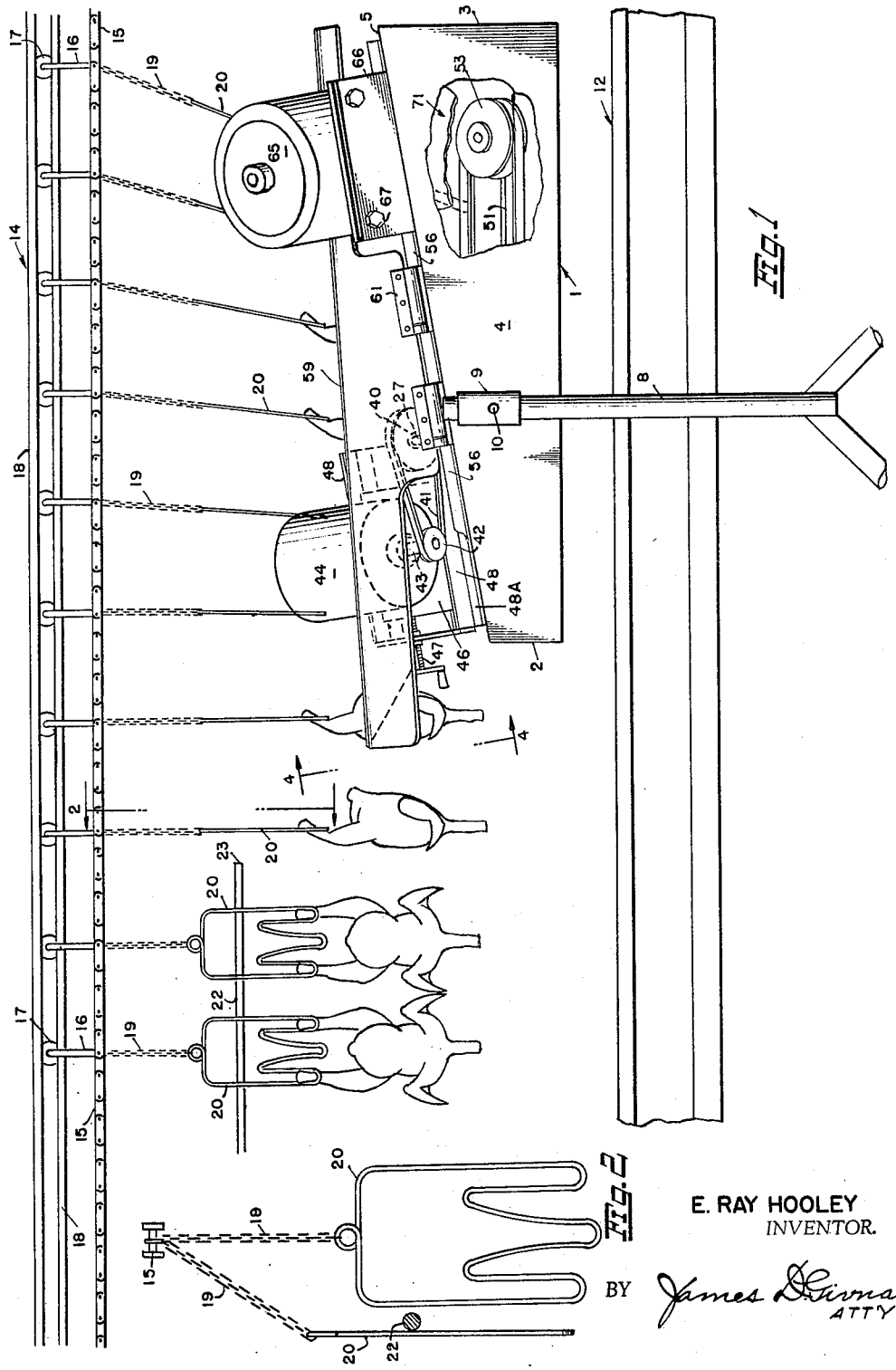
E. RAY HOOLEY
    INVENTOR.
BY James Dickman
          ATTY

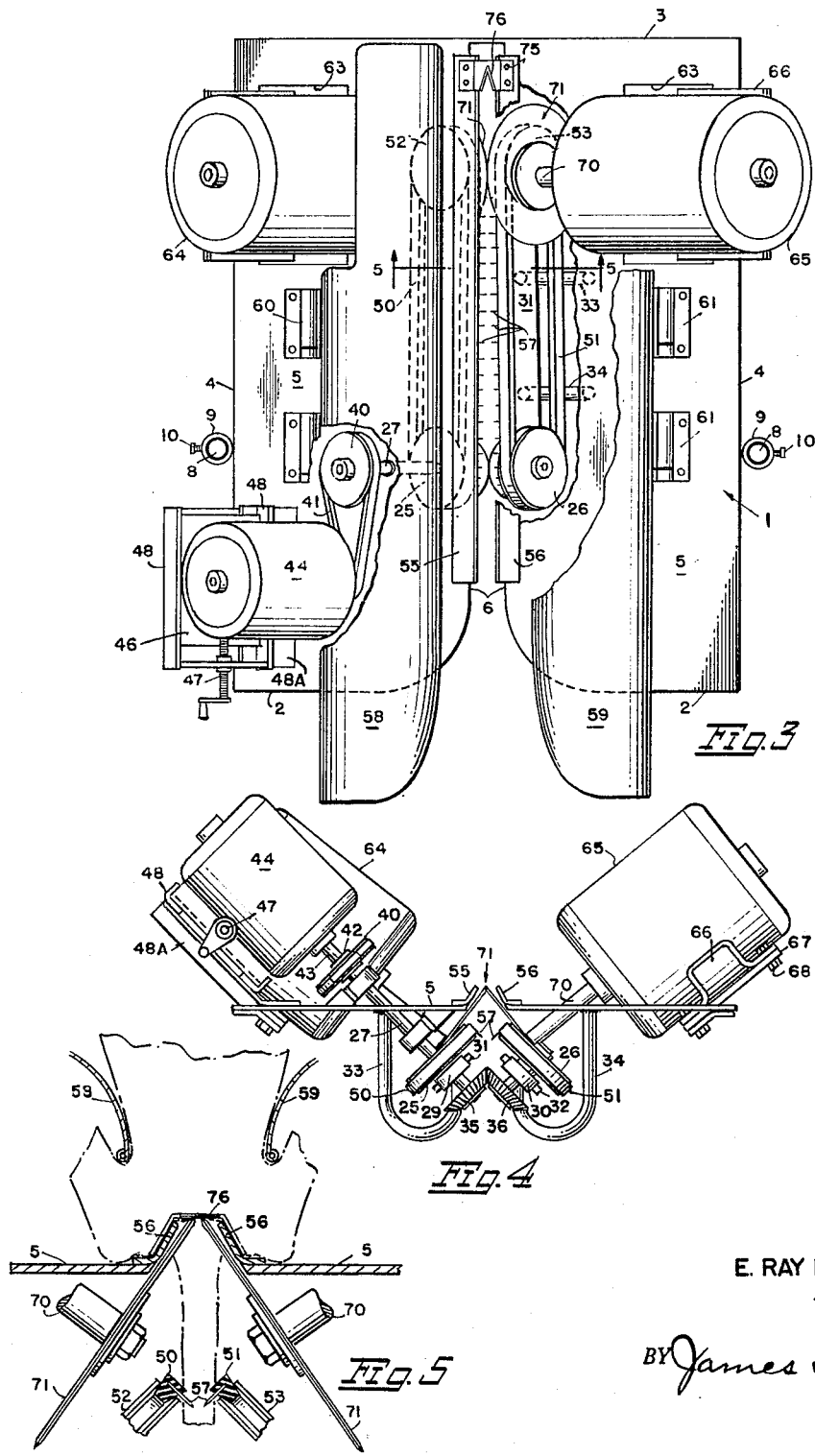

United States Patent Office 3,277,514
Patented Oct. 11, 1966

3,277,514
POULTRY NECK REMOVER
Eldon Ray Hooley, P.O. Box 246, Creswell, Oreg.
Filed Aug. 10, 1964, Ser. No. 388,578
3 Claims. (Cl. 17—11)

This invention relates to poultry processing equipment and more particularly to a machine for automatically severing the neck of a bird from its body at the zone of merger of the bird's neck with its spine.

It is one of the principal objects of the instant invention to provide apparatus of the character described having incorporated therein a new and novel arrangement of cooperating rotary cutting knives which will effectively sever the neck in its entirety and in such a manner as to condition the bird for more compact and better looking packaging for display purposes by eliminating any neck stub. Other neck-severing devices I am aware of are not capable of severing the neck in the manner herein shown and described and thus leave a stub portion which not only detracts from the over-all appearance of the processed and packaged bird but which also projects into and sometimes punctures the customary plastic wrapping for such packages.

Another object is to provide an automatic neck severing machine which will render a saving to the processor by eliminating hand labor previously required for such purpose and which will remove the necks from the birds in a neater, cleaner, and more expeditious manner than heretofore by virtue of cooperating power driven circular saws which cut through the bird's vertebrae instead of relying upon a time-consuming preparatory step of permanently separating a part of the bird's vertebrae prior to advancement into a unitary cutting instrumentality in order to favor the severing operation by establishing a cutting area which is devoid of bone.

A further object of the invention is to incorporate in the machine an auxiliary cutter operating in a horizontal plane adjacent the main cutting saws to insure removal of any residual skin fragments that might escape the initial cutting operation.

Cooperating with the rotary cutting knives in accomplishing the unique neck-severing feature of my invention are two neck-engaging belt members operating on a horizontal plane below the upwardly and rearwardly inclined table top along which the body of the bird is confined to travel with its neck extending below the table top and engaged by the rearwardly traveling belt members. The resultant divergent lines of force and the tensive reaction of the upwardly moving bird body to the horizontal restraint of the neck-engaging belts stretch the neck to a point of maximum tension as it enters the cutting zone of the cutting knives.

The foregoing and other objects and advantages which will become subsequently apparent reside in the details of construction and operation as more fully hereinafter described and claimed, reference being had to the accompanying drawings forming a part hereof and in which:

FIGURE 1 is a side elevational view of the invention with fragments broken away and of a fragment of an endless conveyor for progressively passing poultry through the apparatus for the neck severing operation.

FIGURE 2 is a sectional elevational detail on an enlarged scale taken approximately along the line 2—2 of FIGURE 1 with the fowl removed.

FIGURE 3 is a top plan view of the apparatus with fragments broken away for convenience of illustration.

FIGURE 4 is an end elevational view taken approximately along the line 4—4 of FIGURE 1, with parts omitted and the poultry removed for clearness of illustration, and FIGURE 5 is a fragmental, sectional detail taken approximately along the line 5—5 of FIGURE 3, also with parts removed for convenience of illustration.

With continuing reference to the drawings wherein like reference characters designate like parts, reference numeral 1 indicates generally a table having vertical front and rear walls 2 and 3, vertical side walls 4, and a rearwardly and upwardly inclined top wall 5 divided substantially throughout its length as shown in FIGURE 3 to provide a longitudinal opening 6 therethrough.

The table is mounted upon suitable supporting legs 8 by means of collars 9 lockable to the legs in vertically adjusted positions by means of set screws 10.

The table may be arranged superjacent a suitable trough or sluiceway as indicated generally at 12 for conveying the severed neck, blood, or other residue to a point of disposal.

The table is disposed below a chain driven endless conveyor system indicated generally at 14 including a sprocket chain 15 running in vertical alignment with the slot 6 in the table top 5. The chain is entrained over driving and driven sprockets (not shown) in a conventional manner. The chain is suspended by hangers 16 whose top ends are provided with rollers 17 movable along an endless track 18. Secured to and depending from the conveyor chain 15 by chains 19 are wire shackles 20 especially designed to frictionally or wedgingly engage the legs of poultry to suspend the birds in an inverted position as shown for progressive advancement through the apparatus for the neck severing operation.

Below the chain 15 and vertically offset therefrom, as shown in FIGURE 2, is a guide rod 22 which terminates approximately at a point, indicated at 23, spaced from the forward or entering end of the apparatus. As the loaded shackles are pulled flatwise along the rod 22 the suspended birds are positioned in the manner shown in the first two shackles at the left end of the conveyor. As each shackle becomes pendulous when pulled away from the end 23 of the guide rod 22 and the twist in its chain is thus released, the shackle will gravitate in a spiral path to position the bird transversely of its line of travel in vertical alignment with the conveyor chain 15 for entering the apparatus backwards as shown.

Housed within the four walls of the table 1 are two V-belt pulleys 25 and 26 (see FIGURE 4) secured to shafts 27 and 28 respectively journaled in bearings 29 and 30 secured to the ends of plates 31 and 32 which are secured to the underside of the divided table top 5 by means of two pairs of brackets 33 and 34.

The pulley shafts 27–28 are operatively interconnected by beveled gears 35 and 36 and the shaft 27 of the gear 35 is connected to and driven by a V-belt pulley 40 driven by a V-belt 41 (see FIGURE 1) entrained over a variable speed V-belt pulley 42 (FIGURE 4) secured to the shaft 43 of an electric motor 44. This motor (FIGURE 3) is mounted upon a base 46 slidably adjustable by means of a screw shaft 47 along a frame comprising a pair of rails 48 mounted upon the table top by brackets 48A. Moving the motor 44 forwardly relative to the table top will reduce the effective diameter of the variable speed driving pulley 42, the rotational speed of pulley 40, and pulley 25 and that of pulley 26 because of its driven connection with pulley 25 through the beveled gears 35–36, as aforesaid. Conversely, movement of the motor 44 rearwardly will cause an increase in the effective diameter of the pulley 42 with a resultant increase in speed of the belt pulleys 25 and 26. Companion V-belts 50 and 51, driven by the pulleys 25–26, are entrained respectively over idling pulleys 52 and 53 rotatably carried by the rearward end of the plates 31 and 32. By this arrangement the operational speed of the V-belts 50–51 and the pulleys 52–53 driven thereby may be conveniently coordinated with that of the conveyor chain 15 for a reason which will hereinafter become apparent in describing the processing procedure.

As shown in FIGURE 1, the belts 50–51 operate on a horizontal plane and as shown in FIGURE 3, they converge rearwardly relative to the slot 6 in the table top and to a pair of opposing parallel channel-forming members 55–56 of angular section extending substantially throughout the length of the slot 6. As shown in FIGURE 5, both belts 50–51 are provided with downwardly and inwardly projecting pins 57 for engaging the lower end of the neck of a bird passing through the apparatus as will be more fully hereinafter described. It is to be understood that I do not wish to be limited to this belt and pin combination since properly spaced apart sprocket chains or the like (not shown) provided with pins or lugs could be substituted for the belts 50–51, and sprockets (not shown) substituted for the pulleys 25–26, and 52–53.

A shield on either side of the apparatus is made up of two parts 58 and 59 of identical formation except for their right and left hand disposition. Each part of the shield is of curvilinear section as shown in FIGURE 5 and attached along its outer edge to the table top 5 by pairs of spring-hinges 60–61 which normally maintain the sections in the closed position shown in FIGURE 3 but which will allow the parts to be opened or spread apart to allow access to underlying parts if necessary or desired. The shield when closed, as shown in FIGURE 5 serves to maintain the bird's body in guided alignment with the channel members 55–56.

Mounted to the table top 5 adjacent openings 63 therein near the rearward end thereof and arranged on approximately the angles shown are two identical electric motors 64 and 65. Each motor is adjustably mounted relative to the table top by means of a cradle 66 suitably slotted for adjustable mounting to a base plate 67 by means of bolts 68 extending through the slots and into the base plate.

The bottom or inner ends of the motor shafts 70 are provided with angularly related cooperating rotary cutters 71 rotating in pressureless contact with each other with their apex at the centerline and preferably flush with the top edges of the channel forming elements 55–56. The motors may be electrically wound to drive the cutters in the same direction for some operations, or if desired in opposite directions for other operations.

Secured as at 75 to the channel-forming members 55–56, rearwardly adjacent the rotary cutters 71, is a stationary cutter comprising a center section overlying (see also FIGURE 5) the channel-forming members and having a forwardly opening knife-edged recess 76 adapted to sever any dangling skin or neck particles not severed by the rotary cutters.

The operation of the machine is as follows:

As best illustrated in FIGURE 1, the birds, after swinging into the transverse backward position as aforesaid, are progressively fed into the machine with the bottom end of their necks on the same plane as a line extending lengthwise between the top run of the belts 50–51. When engaged by the belt pins 57 the ends of the necks will be restrained to travel along a horizontal plane while their bodies are pulled upwardly and rearwardly along the inclined table top 5. These divergent lines of force subject the necks to gradually increasing the tension until each neck reaches a point of maximum tension as it enters the cutting zone between the two rotary cutters where the severing operation occurs, as shown in FIGURE 5. After the neck has been removed and the bird continues its travel rearwardly from the rotary cutters, any remaining skin or neck particles dangling from the bird's body will be caught within and cut away by the knife edged recess 66.

It will be readily understood that the depth of the cut by the converging rotary cutters may be varied by using cutters of smaller or larger diameters than that shown and by adjusting their respective driving motors inwardly or outwardly relative to the channel forming members 55–56.

While I have shown a particular form of embodiment of my invention, I am aware that many minor changes therein will readily suggest themselves to others skilled in the art without departing from the spirit and scope of the invention. Having thus described my invention, what I claim as new and desire to protect by Letters Patent is:

1. A poultry processing machine for severing the neck of a bird from its body at the zone of merger of the bird's neck with its spine while the neck is in tension as the bird is advanced along a rectilinear path of travel suspended from a horizontal conveyor, the combination of:
   a table positioned beneath the conveyor having a forward end, a rearward end, an upwardly and rearwardly inclined table top having a longitudinal slot therealong,
   poultry-neck engaging means running lengthwise of and on a horizontal plane below said upwardly and rearwardly inclined table top and said slot therein,
   upwardly converging power driven rotary cutters having their cutting edges in pressureless cooperating contact on the centerline of said slot whereby the neck of a bird drawn between said cutters will be severed from the bird's body by an inverted V-cut to thereby remove the neck in its entirety,
   a stationary cutting instrumentality secured transversely of said slot rearwardly of said rotary cutters whereby any uncut residual skin or neck fragments will be severed by said stationary cutting instrumentality.

2. A poultry processing machine for severing the neck of a bird from its body at the zone of merger of the bird's neck with its spine when the neck reaches a point of maximum tension in its travel through the machine, the combination of:
   a table positioned beneath the conveyor having a forward end, a rearward end, an upwardly and rearwardly inclined table top having a parallel sided longitudinal slot therethrough,
   parallel channel forming members adjacent the sides of said slot,
   poultry-neck engaging means comprising two rearwardly converging horizontally disposed endless belts,
   cooperating shield members hingedly attached to said table top adjacent said channel forming members and adapted to engage and spring-urge the body of the bird into sliding contact with the table top in its travel therealong with the neck of the bird extending downwardly through said channel forming members and said slot,
   power driven rotary cutters having their cutting edges in cooperative pressureless contact at a point centrally of said slot near the rearward end thereof whereby the neck of a bird when reaching said point will be under maximum tension when subjected to the cutting action of said cutters.

3. In poultry processing equipment for severing the neck of a bird from its body at the zone of merger of the bird's neck with its spine, the combination of:
   a conveyor to support the poultry in a neck-down position and to move the poultry along a rectilinear path of travel,
   a table positioned beneath the conveyor having a forward end, a rearward end, an upwardly and rearwardly inclined table top and an elongated slot in said table top,
   said elongated slot disposed beneath said conveyor and having an entrance end to receive the suspended necks of the poultry for passage therethrough,
   means at opposite sides of said slot for slidably engaging the opposing wings of the poultry whereby to stabilize the bodies of the poultry above said slot during passage therealong, poultry neck-engaging means running lengthwise on a horizontal plane below said upwardly and rearwardly inclined table top and said slot therein whereby the resultant divergent lines of restraint will gradually increase neck tension from the entrance of the neck into the slot to a zone of maximum tension at the rearward end of the table top, knife means operating across said slot at said zone of maximum tension for severing the necks of poultry carried by said conveyor through the slot, and said knife means comprising angularly disposed power-driven rotary cutters extending upwardly into said slot.

References Cited by the Examiner

UNITED STATES PATENTS

| | | | |
|---|---|---|---|
| 2,828,506 | 4/1958 | O'Donnell | 17—12 |
| 2,854,690 | 10/1958 | O'Donnell | 17—45 |
| 2,924,846 | 2/1960 | Zebarth | 17—12 |
| 2,926,383 | 3/1960 | Steck | 17—11 |
| 2,993,228 | 7/1961 | Zebarth | 17—12 |
| 3,056,161 | 10/1962 | Zebarth | 17—11 |
| 3,076,998 | 2/1963 | Harben | 17—11 |
| 3,099,858 | 8/1963 | Segur | 17—45 |

SAMUEL KOREN, *Primary Examiner.*

LUCIE H. LAUDENSLAGER, *Examiner.*